(12) United States Patent
Kuzemchak et al.

(10) Patent No.: US 7,162,618 B2
(45) Date of Patent: *Jan. 9, 2007

(54) METHOD FOR ENHANCING THE VISIBILITY OF EFFECTIVE ADDRESS COMPUTATION IN PIPELINED ARCHITECTURES

(75) Inventors: Edward P. Kuzemchak, Avonmore, PA (US); Christine M. Cipriani, Wexford, PA (US); Christophe Favergeon-Borgialli, Nice (FR); Mary P. Luley, Pittsburgh, PA (US)

(73) Assignee: Texas Instruments Incorporated, Dallas, TX (US)

( * ) Notice: Subject to any disclaimer, the term of this patent is extended or adjusted under 35 U.S.C. 154(b) by 800 days.

This patent is subject to a terminal disclaimer.

(21) Appl. No.: 10/022,972

(22) Filed: Dec. 13, 2001

(65) Prior Publication Data

US 2003/0088855 A1 May 8, 2003

(30) Foreign Application Priority Data

Jun. 29, 2001 (EP) .................................. 01401752

(51) Int. Cl.
*G06F 7/38* (2006.01)
*G06F 9/455* (2006.01)
*G06F 12/00* (2006.01)
*G06F 9/44* (2006.01)

(52) U.S. Cl. .................... 712/230; 712/233; 703/23; 711/140; 717/134; 717/135

(58) Field of Classification Search ................ 717/134, 717/126; 703/22; 712/244, 230, 233; 713/324; 708/233

See application file for complete search history.

(56) References Cited

U.S. PATENT DOCUMENTS

| 5,724,563 | A | * | 3/1998 | Hasegawa ................... 712/233 |
| 5,949,993 | A | * | 9/1999 | Fritz ........................... 703/22 |
| 6,081,885 | A | | 6/2000 | Deao et al. |
| 6,308,263 | B1 | * | 10/2001 | Hayakawa et al. ......... 712/230 |
| 6,658,578 | B1 | * | 12/2003 | Laurenti et al. ............ 713/324 |

OTHER PUBLICATIONS

"Cycle and Phase Accurate DSP Modeling and Integration for HW/SW Co-Verification", 1999 ACM, by Lisa Guerra, et al.*
"A Scalable Formal Verification Methodology for Pipelined Micorprocessors", 1996 ACM, by Jeremy Levitt and Kunle Olukotun.*
R. Bryant, M. Velev: *Verification of Pipelined Microprocessors by Comparing Memory Execution Sequences in Symbolic Simulation*, Proc. Of Asian Computer Science Conf., Dec. 1997, pp. 18-31.

* cited by examiner

*Primary Examiner*—Wei Zhen
*Assistant Examiner*—Chih-Ching Chow
(74) *Attorney, Agent, or Firm*—Robert D. Marshall, Jr.; W. James Brady; Frederick J. Telecky, Jr.

(57) ABSTRACT

The invention relates to a method to increase the visibility of effective address computation in pipelined architectures. In this method, the current effective address delay of each instruction in the pipeline is calculated. The current effective address delay is used to determine if a valid effective address is available for each instruction. If a valid effective address for an instruction is not available, it is computed if possible.

2 Claims, 12 Drawing Sheets

| SOURCE EXECUTION | SOURCE | SOURCE STATE | TARGET EXECUTION | TARGET | TARGET STATE |
|---|---|---|---|---|---|
|  | STM data1, AR3 | EMPTY |  | MOV data1, AR3 | EMPTY |
| 401 | LD #1, A |  | 402 | MOV #1, AC0 |  |
|  | NOP |  |  | NOP |  |
|  | NOP |  |  | NOP |  |
|  | STL A, *AR3+ |  |  | MOV AC0<<#0, AR3+ |  |
|  | NOP |  |  | NOP |  |

| SOURCE EXECUTION | SOURCE | SOURCE STATE | TARGET EXECUTION | TARGET | TARGET STATE |
|---|---|---|---|---|---|
|  | STM data1, AR3 | AR3=0x800 | →  402 | MOV data1, AR3 | EMPTY |
| →  401 | LD #1, A | | | MOV #1, AC0 | |
| | NOP | | | NOP | |
| | NOP | | | NOP | |
| | STL A, *AR3+ | | | MOV AC0<<#0, AR3+ | |
| | NOP | | | NOP | |

| SOURCE EXECUTION | SOURCE | SOURCE STATE | TARGET EXECUTION | TARGET | TARGET STATE |
|---|---|---|---|---|---|
|  | STM data1, AR3 | AR3=0x800 | →  | MOV data1, AR3 | XAR3= 0x430 |
| →  401 | LD #1, A | | 402 | MOV #1, AC0 | |
| | NOP | | | NOP | |
| | NOP | | | NOP | |
| | STL A, *AR3+ | | | MOV AC0<<#0, AR3+ | |
| | NOP | | | NOP | |

| SOURCE EXECUTION | SOURCE | SOURCE STATE | TARGET EXECUTION | TARGET | TARGET STATE |
|---|---|---|---|---|---|
| | STM data1, AR3 | AR3=0x800 A=1 | | MOV data1, AR3 | XAR3= 0x430 |
| | LD #1, A | | →  402 | MOV #1, AC0 | |
| → 401 | NOP | | | NOP | |
| | NOP | | | NOP | |
| | STL A, *AR3+ | | | MOV AC0<<#0, AR3+ | |
| | NOP | | | NOP | |

FIG. 4D

| SOURCE EXECUTION | SOURCE | SOURCE STATE | TARGET EXECUTION | TARGET | TARGET STATE |
|---|---|---|---|---|---|
| | STM data1, AR3 | AR3=0x800 A=1 | | MOV data1, AR3 | XAR3= 0x430 AC0=1 |
| | LD #1, A | | | MOV #1, AC0 | |
| → 401 | NOP | | → 402 | NOP | |
| | NOP | | | NOP | |
| | STL A, *AR3+ | | | MOV AC0<<#0, AR3+ | |
| | NOP | | | NOP | |

| SOURCE EXECUTION | SOURCE | SOURCE STATE | TARGET EXECUTION | TARGET | TARGET STATE |
|---|---|---|---|---|---|
| | STM data1, AR3 | AR3=0x800 (*AR3)=1 | | MOV data1, AR3 | XAR3= 0x430 |
| | LD #1, A | | | MOV #1, AC0 | |
| | NOP | | ← 402 | NOP | |
| | NOP | | | NOP | |
| 401 | STL A, *AR3+ | | | MOV AC0<<#0, AR3+ | |
| ↙ | NOP | | | NOP | |

FIG. 4G

| SOURCE EXECUTION | SOURCE | SOURCE STATE | TARGET EXECUTION | TARGET | TARGET STATE |
|---|---|---|---|---|---|
| | STM data1, AR3 | AR3=0x800 (*AR3)=1 | | MOV data1, AR3 | XAR3= 0x430 (*XAR3)=1 |
| | LD #1, A | | | MOV #1, AC0 | |
| | NOP | | | NOP | |
| | NOP | | | NOP | |
| 401 | STL A, *AR3+ | | 402 | MOV AC0<<#0, AR3+ | |
| ↙ | NOP | | ↙ | NOP | |

*FIG. 4H*

| SOURCE EXECUTION | SOURCE | SOURCE STATE | TARGET EXECUTION | TARGET | TARGET STATE |
|---|---|---|---|---|---|
|  | STM data1, AR3 |  |  | MOV data1, AR3 |  |
|  | LD #1, A |  |  | MOV #1, AC0 |  |
|  | NOP | EMPTY |  | NOP | EMPTY |
|  | NOP |  |  | NOP |  |
| 401 | STL A, *AR3+ |  | 402 | MOV AC0<<#0, AR3+ |  |
|  | NOP |  |  | NOP |  |

METHOD FOR ENHANCING THE VISIBILITY OF EFFECTIVE ADDRESS COMPUTATION IN PIPELINED ARCHITECTURES

This application is related to and claims priority under 35 USC §119 (a) to European Application No. 01401752.9, (TI-32964EU) *Method for Enhancing the Visibility of Effective Address Computation in Pipelined Architectures*, filed on Jun. 29, 2001. This application is also related to application Ser. No. 10/017,077, which is entitled *Method and Tool for Verification of Algorithms Ported From One Instruction Set Architecture to Another.*

TECHNICAL FIELD OF THE INVENTION

The present invention relates to verification of software applications ported between differing instruction set architectures and to the debugging of software applications executed on pipeline architectures.

BACKGROUND OF THE INVENTION

As new general-purpose processors and digital signal processors (DSP) are introduced, existing software applications are ported from the old generation of processors to the new generation. When an application is ported, the software developer responsible for the port must verify that the application executes correctly on the new processor architecture. Generally, this verification consists of executing the application on the target processor (or in a simulator or emulator) and debugging it when problems are detected. This can be a time-consuming process if the applications are large. There is no means available to automatically verify that the execution of the ported version of the application is equivalent to the execution of the original version where equivalency means that both versions of the application wrote the same values to memory.

When an application is ported to a new processor architecture, there may not be a one-to-one correspondence between the memory addresses in the source program and those of the target program. The size of the application may have increased or decreased due to instruction set differences or a data structure may have been relocated in memory or merged with another data structure to take advantage of special features of the target architecture. This disparity in memory addresses between the source and the target versions of the application complicates the verification process as the contents of the mapped address registers in each version will not necessarily be the same.

Most modern general-purpose microprocessors and digital signal processors have a central processing unit (CPU) pipeline where multiple instructions are in various stages of execution at any given time. Instructions may cause effects that mask one another at the level of visibility of a debugger, making it difficult for a verification process or a debugger to see the interim results of an instruction in progress.

SUMMARY OF THE INVENTION

An illustrative embodiment of the present invention seeks to provide a software system and method for automatically verifying the correct execution of an application that has been ported from one instruction set architecture (ISA) to another ISA. In this method, versions of the application are prepared for the source ISA and the target ISA. These versions are then executed on a simulator or emulator for the appropriate ISA and all changes made in memory during execution are recorded. Finally, the results of the two executions are compared to determine if they are equivalent and the results of this verification are displayed.

In one embodiment of the present invention, the method is enhanced such that during the verification process the source and target versions of the application are executed in turn on their respective ISA simulator or emulator and a comparison to determine equivalency is done each time a change in memory is made during execution.

In another embodiment, indirect memory writes are validated symbolically during the verification process. The verification process treats references to address registers as symbols and computes the effective addresses of the analogous references in the source and target applications independently when attempting to verify that two unreconciled states are equivalent.

In an embodiment, the verification method is further enhanced to increase the visibility of effective address computation in pipelined architectures.

These and other features of the invention will be apparent to those skilled in the art from the following detailed description of the invention, taken together with the accompanying drawings.

DESCRIPTION OF THE DRAWINGS

FIG. 2 is a flow graph of a method used by the system of FIG. 1 to verify that a source version and a target version of an application ported from one ISA to another exhibit equivalent execution results;

FIGS. 4A–4H present a simple example of the operation of the verification method of FIG. 3;

Corresponding numerals and symbols in the different figures and tables refer to corresponding parts unless otherwise indicated.

DETAILED DESCRIPTION OF THE INVENTION

A verification tool has been developed to facilitate the debugging of ported applications. This tool compares the instruction by instruction execution of the original or source version of the application with the instruction by instruction execution of the ported or target version and reports any discrepancies at or near the instruction where the two versions begin to vary.

Figure 1:
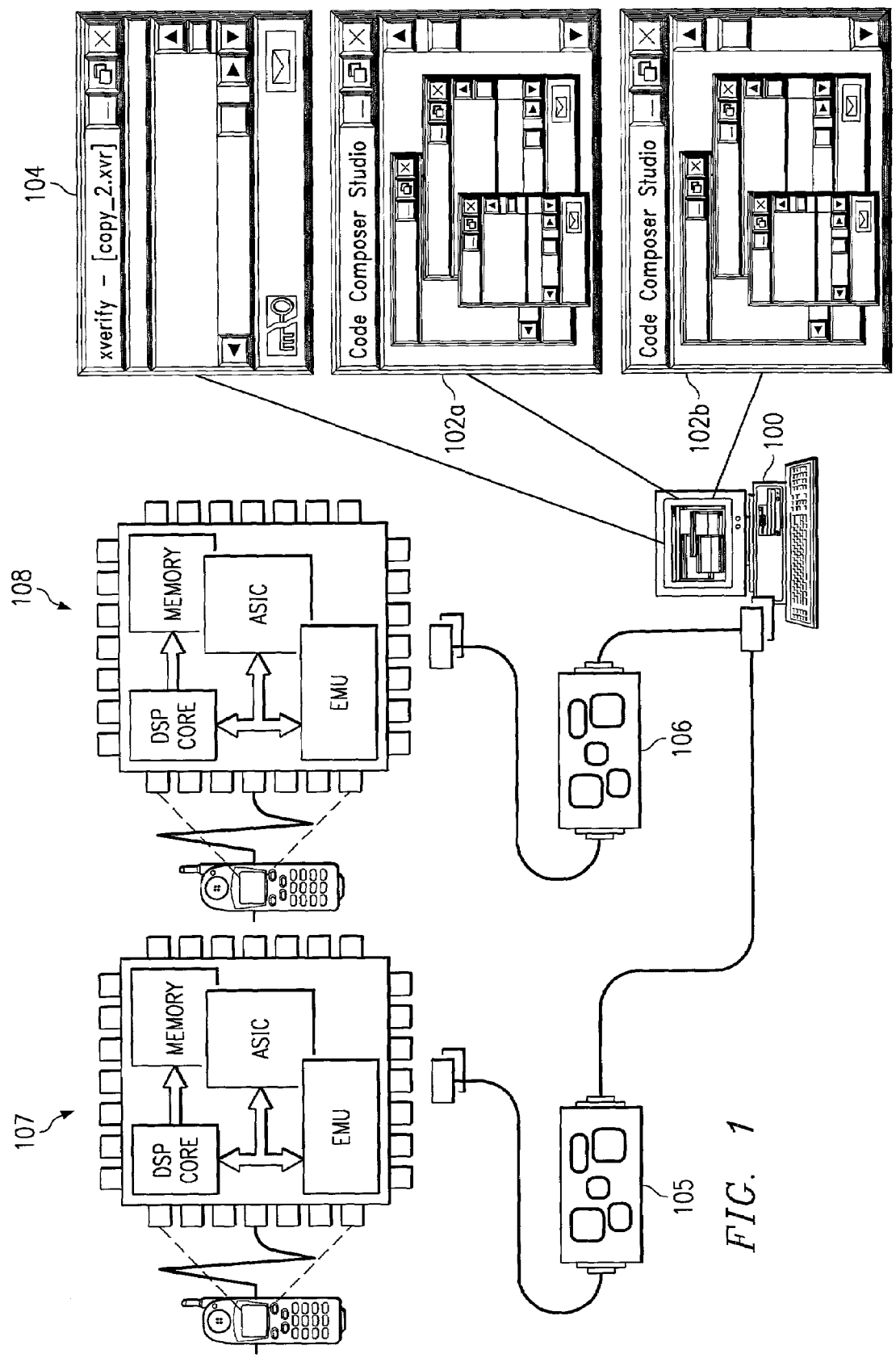
FIG. 1 illustrates the elements of a system embodying the present invention for automatically verifying the correct execution of applications that have been ported from one instruction set architecture (ISA) to another.

FIG. 1 illustrates the elements of a system for automatically verifying the correct execution of applications that have been ported from one instruction set architecture (ISA) to another. General purpose computing system 100 hosts two software development systems as represented by displays 102a and 102b and verification software as represented by display 104.

In a first embodiment, software development system 102a contains simulation software to support a source ISA, and software development system 102b contains simulation software to support a target ISA. The user prepares two versions of an application to be verified, the source version and the target version. The source version of the application will execute on the source ISA supported by the simulation software in software development system 102a and the target version will execute on the target ISA supported by the simulation software in software development system 102b. Verification software 104 causes the two versions of the application be executed in the appropriate simulation software and verifies that the application has equivalent execution behavior on both ISAs.

In a second embodiment, emulation hardware 105 and 106 connects source hardware 107 and target hardware 108 respectively to general-purpose computer 100. Emulation hardware 105 supports the source ISA and emulation hardware 106 supports the target ISA. Emulation hardware 105 is assigned to software development system 102a and emulation hardware 106 is assigned to software development system 102b. Using the appropriate software development system, the user prepares the source and target versions of an application to be verified. The source version is executed on source hardware 107 under the control of emulation hardware 105 and the target version is executed on target hardware 108 under the control of emulation hardware 106. Verification software 104 directs each software development system 102 to execute its version of the application on the associated emulation hardware. Software development system 102 downloads the software application to the assigned emulation hardware and verification software 104 then directs the execution of each version of the application and verifies that the application has equivalent execution behavior on both ISAs.

In a third embodiment, software development system 102a may be connected to emulation hardware 105 supporting one ISA and software development system 102b may contain simulation software for a different ISA. The user prepares the source and target versions of the software application to be verified, one for each ISA. Verification software 104 causes the source version for the first ISA to be executed by software development system 102a in emulation mode and the target version for the second ISA to be executed by software development system 102b in simulation mode. Verification software 104 then directs the execution of each version of the application and verifies that the application has equivalent execution behavior on both ISAs.

The fact that the application is being executed on a simulator or an emulator is irrelevant to the operation of the present invention. For purposes of simplicity in the remainder of this specification, a simulator will be assumed. However, it should be noted that a simulator and an emulator may be used interchangeably. For purposes of the present invention, an emulator is: 1) any program or device with the ability to imitate the execution of an instruction set on a processor architecture; 2) any device that executes an instruction set as it would be executed on its processor architecture (e.g., in-circuit emulation); or, 3) any program or device that permits user control of the execution of an instruction set on the actual processor (on-chip emulation).

Figures 2, 4A:
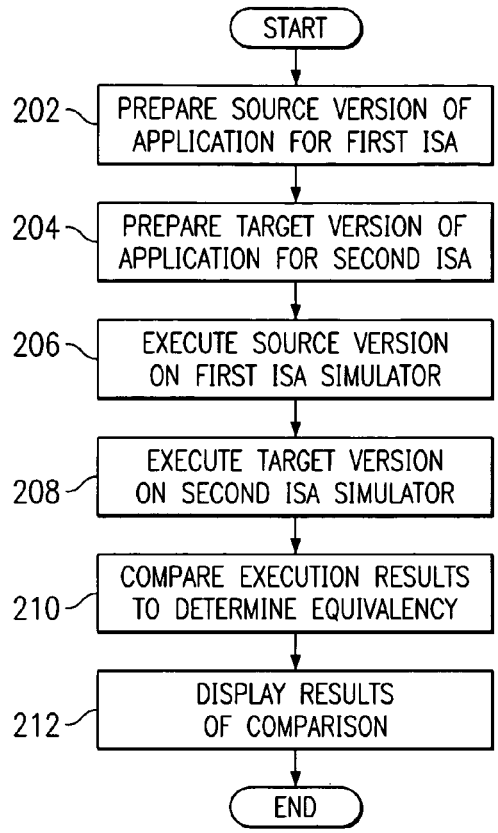

FIG. 2 is a flow graph of a method used by verification software 104 to verify that a source version and a target version of an application exhibit equivalent execution results. In steps 202 and 204, the source and target versions of the application are created. These versions are generally prepared (assembled or compiled and linked) using the software development tools in the corresponding software development system 102. The source code for the source version is not changed. The user merely assembles or compiles the source code and creates a load module. The user may make some changes to the source code to create the target version of the application, especially if the two ISAs are not instruction set compatible. These changes might include accommodating new instruction mnemonics or using features of the target ISA.

In steps 206 and 208, the source and target versions of the application are executed in the corresponding ISA simulators under the direction of verification software 104. Verification software 104 compares the results of the execution of each version and determines whether or not the results are equivalent. In step 212, verification software 104 displays the results of the comparison.

Figure 3A:
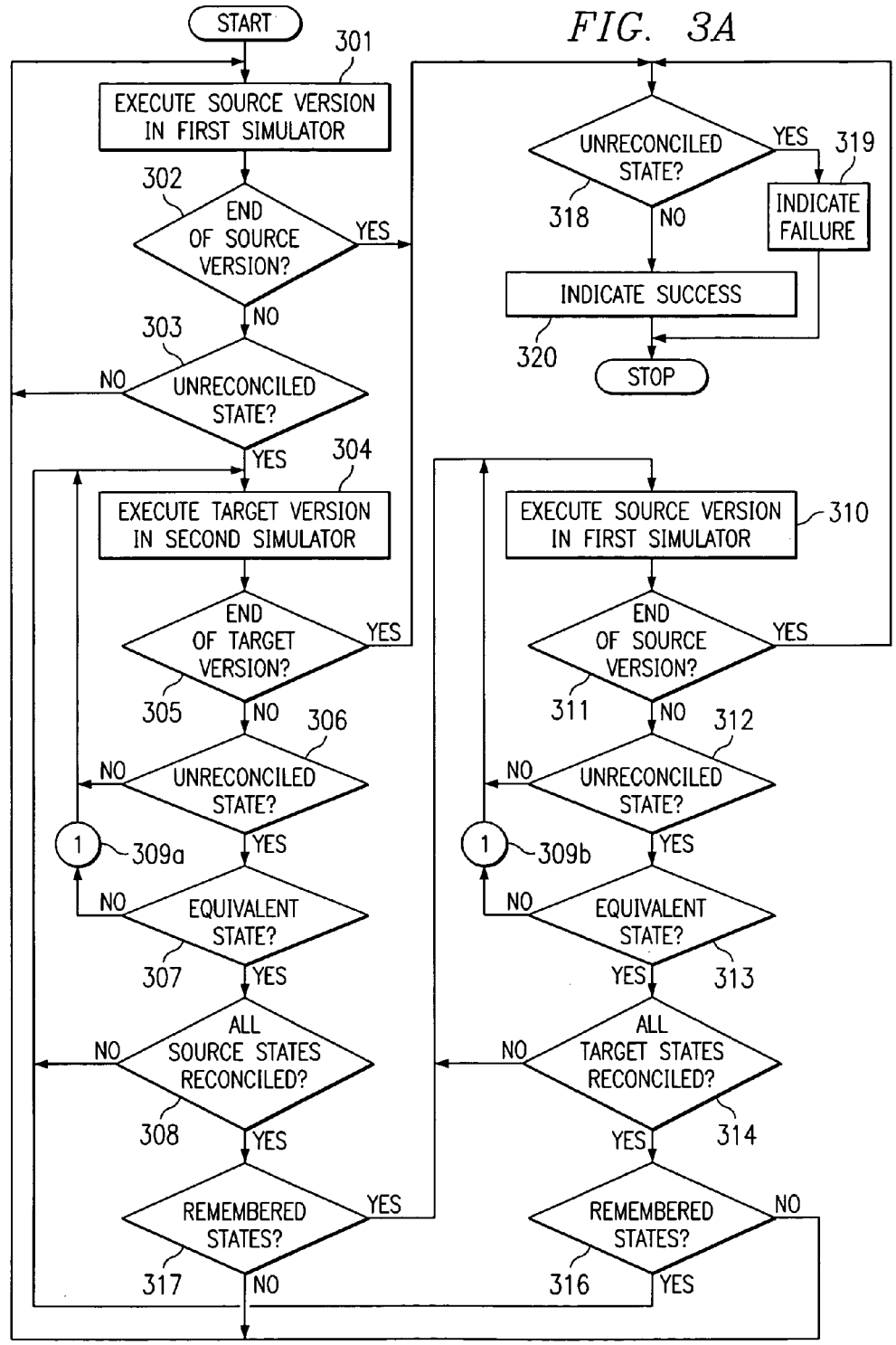
FIG. 3, consisting of FIGS. 3A–3B, presents a flow graph of a version of the method of FIG. 2 for verifying by co-execution that a source version and a target version of an application ported from one ISA to another exhibit equivalent results.
Figures 3B, 4B, 4C:
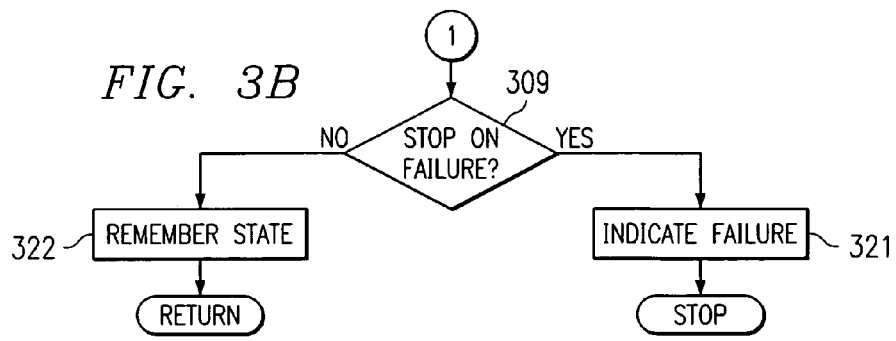

FIG. 3, consisting of FIGS. 3A–3B, presents a flow graph of a version of the method of FIG. 2 for verifying by co-execution that a source version and a target version of an application ported from one ISA to another exhibit equivalent results. This flow graph illustrates one way in which steps 206, 208, and 210 of FIG. 2 may be interleaved to accomplish the verification task. Although this flow graph illustrates a method that begins with the execution of the source version of the application, this choice is purely arbitrary. Either version may be executed initially.

In step 301, a single instruction of the source version of the application is executed in the first ISA simulator. In step 302, a check is made to determine if the end of the source version has been reached. If so, the requested verification is complete and execution continues at step 318. At step 318, a check is made to determine if any unreconciled state exists. If such a state does exist, failure of the verification is indicated at step 319 and the method exits. If no unreconciled state exists, success is indicated at step 320 and the method ends.

If not, a check is made at step 303 to determine if the execution of the instruction has created an unreconciled state. An unreconciled state is created by a write to an accumulator, an address register, or to memory (direct, indirect, or absolute). Execution of the source version continues until either the end of the version is reached or an unreconciled state is created. When an unreconciled state is found, execution of the source version is halted and the target version is executed in the second simulator.

At step 304, a single instruction of the target version of the application is executed. If the end of the target version is detected in step 305, the requested verification is complete and the final portion of the method is executed beginning at step 318. If an unreconciled state is detected (step 306), this state is compared with the unreconciled states detected in the execution of the source version at step 307. If it is not equivalent to one of the unreconciled states from the previous execution of the source version, execution continues at step 309 in subflowgraph 1 of Figure B as indicated at step 309a. A check is made to determine if the stop on failure option (discussed below in reference to FIG. 6C), is active. If it is not active, the current unreconciled state is recorded at step 322 and execution continues at step 304. If it is, failure of the verification is indicated at step 321 and the method ends.

If an equivalency is found at step 307 by comparing the unreconciled state detected at step 306 with the unreconciled states found in the execution of the source version, the equivalent source and target states are marked as reconciled. A check is made at step 308 to determine if all unreconciled states resulting from the execution of the source version have been reconciled. If not, execution of the target version continues at step 304. If all such states have been reconciled, a check is made at step 317 to determine if there are any unreconciled state that have been detected and recorded during this execution of the target version. If there are, execution of the source version is resumed at step 310. Otherwise, execution of the source version resumes at step 301.

At step 310, a single instruction of the source version of the application is executed. If the end of the source version is detected in step 311, the requested verification is complete and the final portion of the method is executed beginning at step 318. If an unreconciled state is detected (step 312), this state is compared at step 313 with the unreconciled states (if any) detected in the execution of the target version. If it is not equivalent to one of the unreconciled states from the previous execution of the target version, execution continues at step 309 in subflowgraph 1 of Figure B as indicated at step 309b. A check is made to determine if the stop on failure option (discussed below in reference to FIG. 6C), is active. If it is not active, the current unreconciled state is recorded at step 322 and execution continues at step 310. If it is, failure of the verification is indicated at step 321 and the method ends.

If an equivalency is found at step 313 by comparing the unreconciled state detected at step 312 with the unreconciled states found in the execution of the target version, the equivalent source and target states are marked as reconciled. A check is made at step 314 to determine if all unreconciled states resulting from the execution of the target version have been reconciled. If not, execution of the source version continues at step 310. If all such states have been reconciled, a check is made at step 316 to determine if there are any unreconciled states that have been detected and recorded during this execution of the source version. If there are, execution of the target version is resumed at step 304. Otherwise, execution of the source version resumes at step 301.

FIGS. 4A–4H present a simple example of the operation of the verification method of FIG. 3. Source column 403 contains a short sequence of assembly language instructions for the source ISA. Target column 404 contains another short sequence of assembly language instructions for the target ISA. This latter sequence, when executed, yields equivalent results to that of the sequence in source column 403. The operation of each instruction is explained in Table 1. Source state column 405 and target state column 406 contain any unreconciled state that occurs as the associated instruction sequence is executed. Arrows 401 and 402 indicate the execution progress of the source instruction sequence and the target instruction sequence, respectively. Table 2 contains the mapping of the registers between the source ISA and the target ISA. This mapping determines how each register in the source ISA is to be compared to the corresponding register in the target ISA during the verification process.

TABLE 1

| Instruction | Explanation |
| --- | --- |
| STM data1, AR3 | Store the address of data1 in address register 3. |
| LD #1, A | Load a register (A) with an immediate value (1) |
| NOP | No operation |
| STL A, *AR3+ | Store the low bits of the accumulator (A) to memory at the address in address register 3 and autoincrement the address |
| MOV data1, AR3 | Store the address of data1 in address register 3 |
| MOV #1, AC0 | Move an immediate value (1) to the accumulator (AC0) |
| MOV AC0<<#0, AR3+ | Move the low bits of the accumulator (AC0) to memory at the address in address register 3 and autoincrement the address |

TABLE 2

| Source Register | Target Register |
| --- | --- |
| A | AC0 |
| B | AC1 |
| AR1 | XAR1 |
| AR2 | XAR2 |
| AR3 | XAR3 |
| AR4 | XAR4 |
| AR5 | XAR5 |
| AR6 | XAR6 |
| AR7 | XAR7 |

FIG. 4A illustrates the initial state before the verification begins. Arrows 401 and 402 are pointing to the first instruction in their associated instruction sequences and state columns 405 and 406 are empty. In FIG. 4B, the first instruction in source column 403 has been executed and arrow 401 is now pointing to the second instruction. The execution of the first instruction caused the address of the variable data1 to be written into register AR3 thus creating an unreconciled state. The existence of this unreconciled state is recorded in source state column 405.

Because there is now an unreconciled state, execution of the source instruction sequence is stopped and the target instruction sequence is executed in an attempt to create an equivalent state. In FIG. 4C, the first instruction in target column 404 has been executed and arrow 402 is pointed to the subsequent instruction. The execution of the first target instruction caused the address of the variable data1 to be written into register AR3 thus creating an unreconciled state. The existence of this unreconciled state is recorded in target state column 406. Although the value written into AR3 by the target sequence is different than that written into AR3 by the source sequence, these states are possibly equivalent as long as AR3 is used as an address register. However, the states are not yet reconciled. Both instruction sequences must be executed further to ascertain whether a reconciliation occurs.

Leaving the contents of state columns 405 and 406 unchanged as a full equivalency has not been found, the execution of the source instruction sequence is resumed. In FIG. 4D, the second instruction of the source sequence has been executed and arrow 401 is pointing to the subsequent NOP instruction. The execution of this instruction has created another unreconciled state as indicated in source state column 405 because a constant 1 has been written to the accumulator A.

Returning to the target instruction sequence, the next instruction in its sequence is executed as shown in FIG. 4E. Arrow 402 has been moved to the subsequent NOP instruction and a constant 1 has been written to accumulator AC0. This new unreconciled state is recorded in target state column 406. As Table 2 above indicates, accumulator A in the source ISA is to be compared to accumulator AC0 in the target architecture for verification purposes. Both have had the same value written to them, so the source state and the target state are equivalent and may be reconciled. These states may now be removed from state columns 405 and 406 as is shown in FIG. 4F.

At this point, both the source and the target have used corresponding registers (see Table 2) as address registers and have written the same value to memory based on the contents of those registers. The execution states of the source and the target are equivalent and the unreconciled states dealing with AR3 may now be removed from state columns 405 and 406. FIG. 4H reflects that the verification up to this point is successful and all unreconciled states have been reconciled.

Figure 5A:
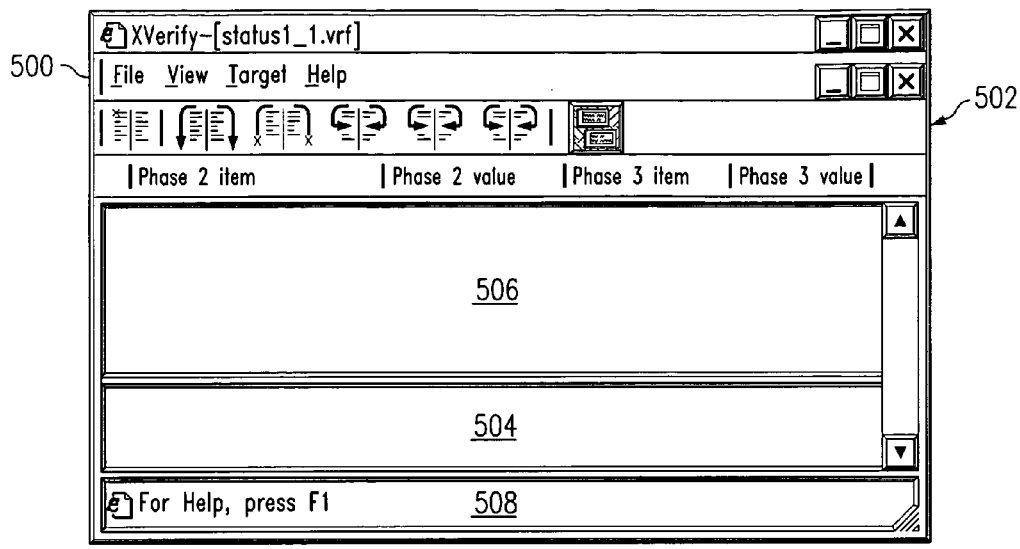
FIGS. 5A–5B present the main graphical display of an embodiment of the verification method of FIG. 3.
Figure 5B:
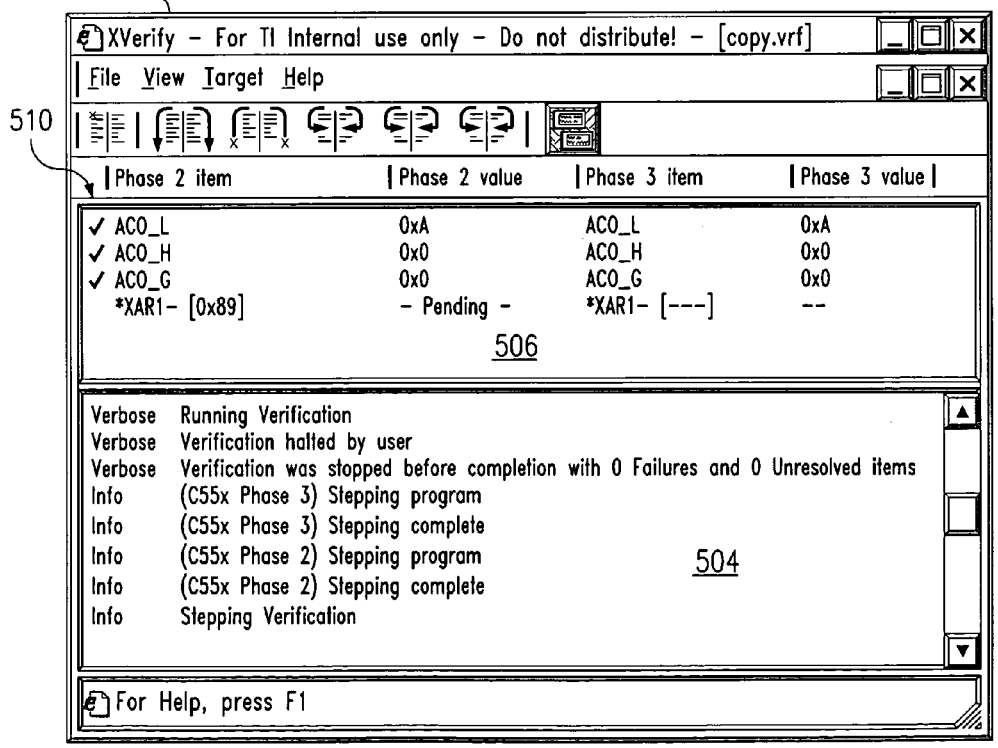

FIGS. 5A–5B representative illustrations of a main graphical display of an embodiment of the present invention. FIG. 5A exemplifies the contents of this display when the verification program is started and FIG. 5B exemplifies the contents of this display when a verification is in progress. This display is comprised of menu bar 500, tool bar 502, message view 504, verification state view 506, and status bar 508. Menu bar 500 is used by the user to input all commands to the verification tool. The options available for each menu item are presented in Table 3 below.

TABLE 3

| Menu | Submenu | Action |
|---|---|---|
| File | New (ctrl-N) | Start a new verification document, closing the current document if one exists. |
| | Open (ctrl-O) | Open an existing verification document. |
| | Save (ctrl-S) | Save the current verification document |
| | Save As | Save the current verification document as a different name |
| | Close | Close the current verification document. Prompt the user offering to save if the document has been modified. |
| | <file1 . file4> | Up to 4 of the most recently opened files. Selecting one of these will open that file. |
| | Exit | Exit the program |
| View | Toolbar | Show/hide the toolbar |
| | Status bar | Show/hide the status bar |
| | Code Composer | Show/hide software development system |
| | Options . . . | Show the options dialog |
| Target | Run Verification | Run a verification session until a problem is found or the stop address is reached |
| | Step Verification | Step one software development (whichever needs to be stepped) until the state of the verification changes |
| | Stop Verification | Stop a verification that is running |
| | Step Source | Step the program in the source software development system one instruction |
| | Step Target | Step the program in the target software development system one instruction |
| Help | Topics | Bring up help, showing the table of contents |
| | About | Show the About dialog |

Returning to the source instruction sequence, the instructions are executed until a new unreconciled state is created by the execution of the STL instruction. As FIG. 4F illustrates, arrow 401 is now pointing to the NOP instruction following the STL instruction. This instruction has caused the contents of accumulator A to be written to the memory address in register AR3. This new unreconciled state is reflected in state column 403.

Returning to the target instruction sequence, the instructions are executed until a new unreconciled state is created by the execution of the MOV instruction. As FIG. 4G illustrates, arrow 403 is now pointing to the NOP instruction following the final MOV instruction in the target instruction sequence. This last MOV instruction has caused the contents of accumulator AC0 to be written to the memory address in register AR3. This new unreconciled state is reflected in state column 405.

Toolbar 502 provides the user with icons to use as shortcuts to commonly used functions such as those used to control the progress of the verification. Status bar 508 displays messages indicating the state of the verification process. As the source or target program is stepped, the action taken is displayed on the right side of status bar 508. Also, a short description of each menu item or toolbar button highlighted appears in status bar 508.

Verification state view 506 displays the list of all unreconciled state changes that have occurred in the source and target programs. It displays the register or memory address that is affected and the contents of that register or memory address. Icons in column 510 indicate the status of the reconciliation attempts for each associated pair of unreconciled states. Table 4 defines the icons that may be present in column 510. An example of the contents of verification state view 506 during the execution of a verification is shown in FIG. 5B.

TABLE 4

| Icon | Explanation |
|------|-------------|
|  | No icon indicates that this item has not yet been determined to match or not match. |
| Check | A green check indicates that this item has matched and will be cleared from the display after a number of steps indicated in the Display dialog. |
| X | A red X indicates that this item has been written by both the source and the target, but with different values. This indicates an incompatibility that should be examined by the user. |
| ! | A purple exclamation indicates that a warning has been noted on this item because the state of the two CPUs was not consistent during the execution of this item. This item should be examined by the user. |
| Clock | A clock indicates that this item is over aged, that is, significant time has elapsed (time limit specified by user) since one version wrote to this item and the other version has yet to write to the item. The verification process will continue to track the item looking for a match, but this item will no longer influence execution of the verification algorithm. |

Message view 504 displays a scrollable list of messages from the verification program. These messages keep the user informed of the state of the verification process. The user may control what level of messages are sent to this window (diagnostics, verbose information, short information, error messages) through the options dialog described in the discussion of FIGS. 6A–6F below and may log the messages to a file. Messages may be triggered by starting, stopping, or stepping a verification, the detection of a stop address in the source program, the removal of an address register mismatch due to a successful write-through of the address register with the same values, etc. An example of the contents of message view 504 during the execution of a verification is shown in FIG. 5B.

Figure 6A:
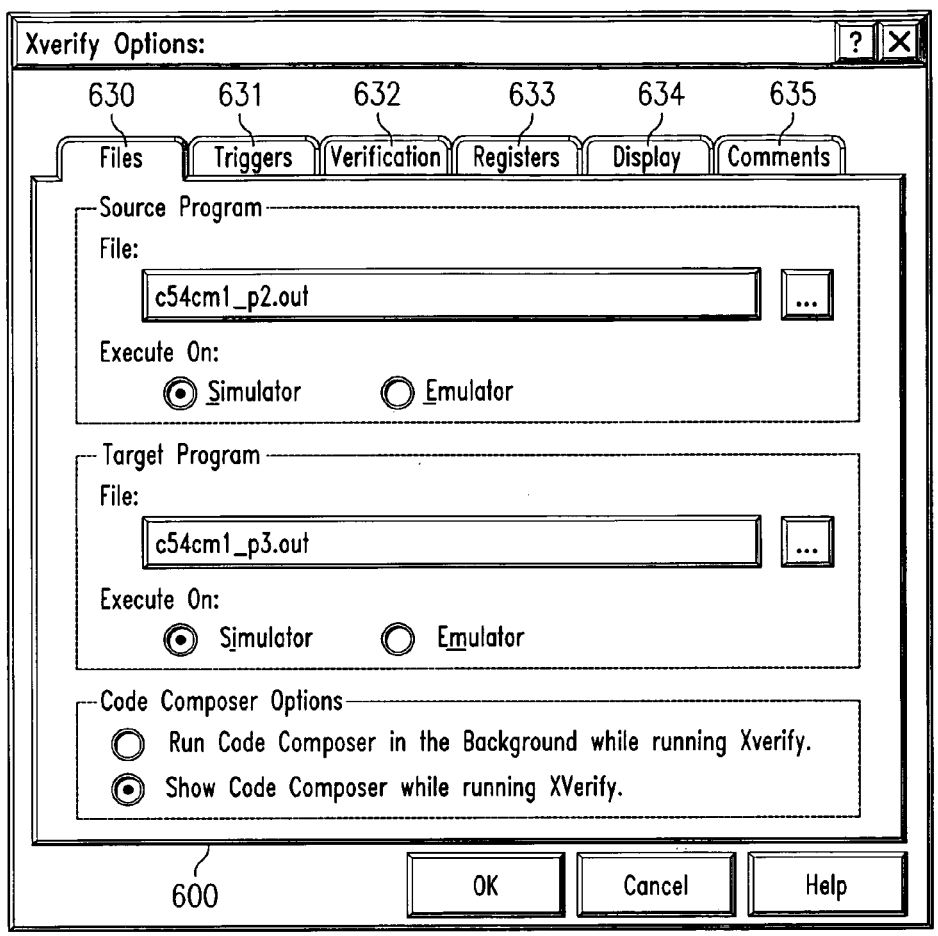
FIGS. 6A–6F present the options dialog used to specify the parameters for controlling a verification process in an embodiment of the verification method of FIG. 3.

FIGS. 6A–6F are representative of an options dialog used to specify the parameters for controlling a verification. Each of 6A–6F represents a screen displayed in response to the selection of one of the tabs 630–635. When the user selects File/New (see Table 3) from toolbar 500, the options dialog screen in FIG. 6A is displayed. (This dialog is also displayed when the user selects the View/Options from toolbar 500 to modify a previously created verification document or when file tab 630 is selected.) Files display 600, which is the default initial screen when the options dialog is displayed, allows the user to specify the source and target programs to be loaded into the source and target simulators.

A verification document is a file that contains all the parameters for a verification session. These parameters are defined by the user using the options dialog shown in FIG. 6A. The parameters are comprised of the file names of the source and target versions of the application, a list of ON, OFF, and STOP trigger addresses for both the source and target versions, the maximum number of verification steps to be executed before an unmatched item is considered a difference, etc.

Figure 6D:
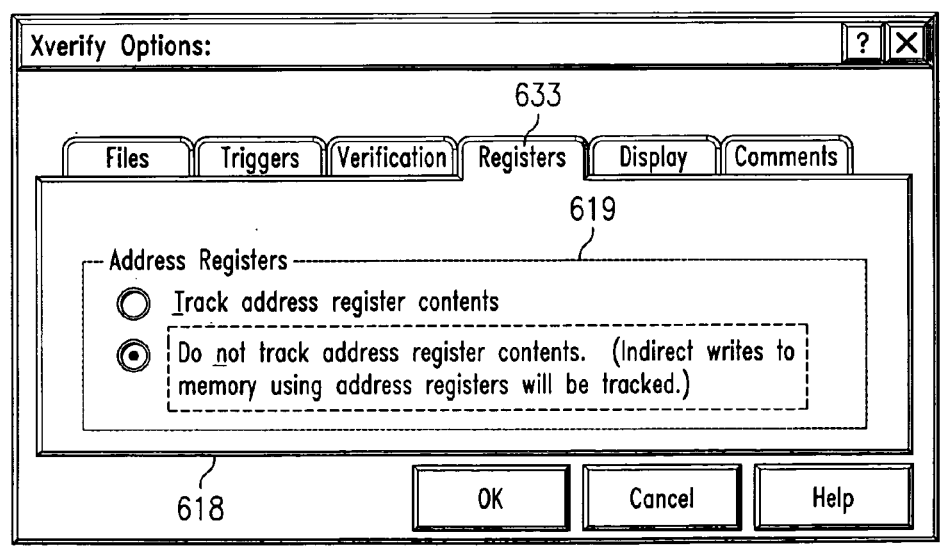
Figure 6B:
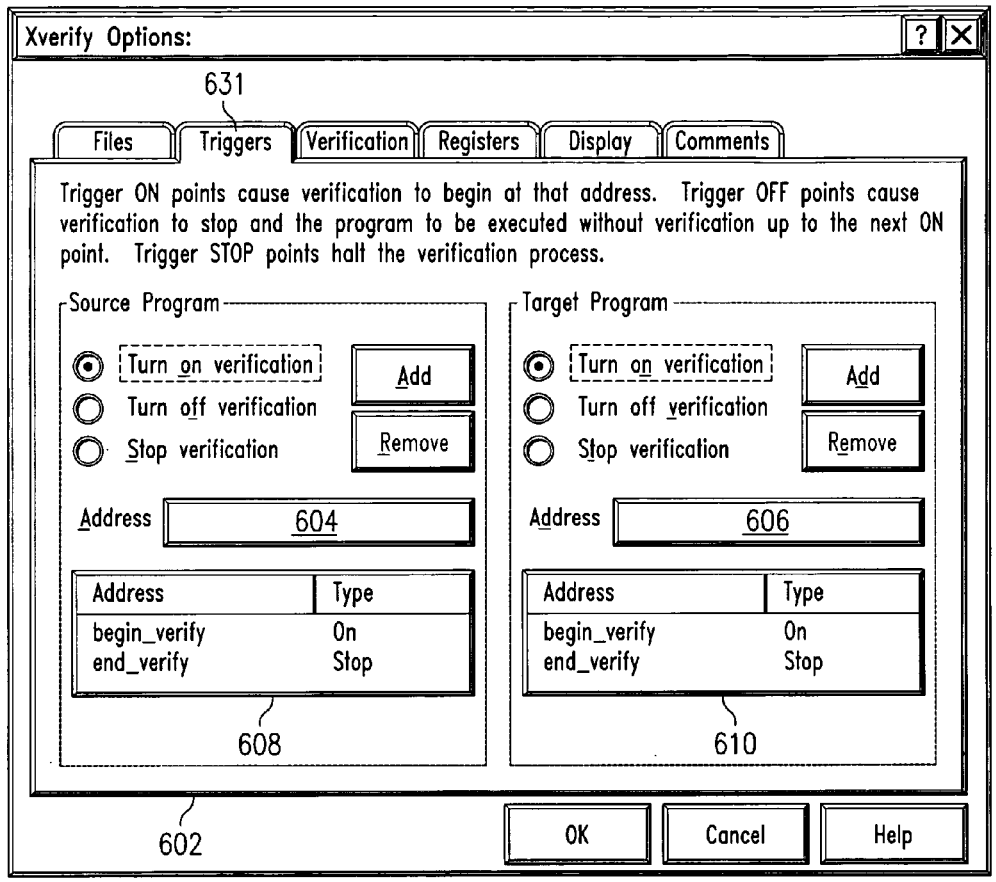

Triggers display 602, displayed by selection trigger tab 631 and shown in FIG. 6B, allows the user to specify addresses in the source and target programs where verification is turned on, turned off, or stopped. ON verification points are addresses where the validation process should start (or restart) reconciling the actions of the source and target programs. OFF verification points are addresses where the verification should stop reconciliation and simply run the program until the next ON or STOP point. STOP verification points are places where the verification process should halt. Addresses 604 and 606 may be entered in decimal or hexadecimal numeric format or may be an actual symbol in the program. List displays 608 and 610 display the addresses and types of all triggers that have been specified for the source and target programs, respectively.

Figure 6F:
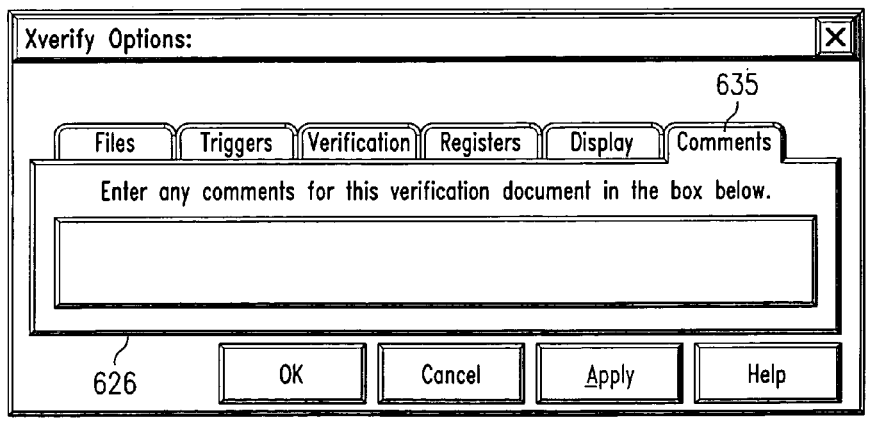
Figure 6C:
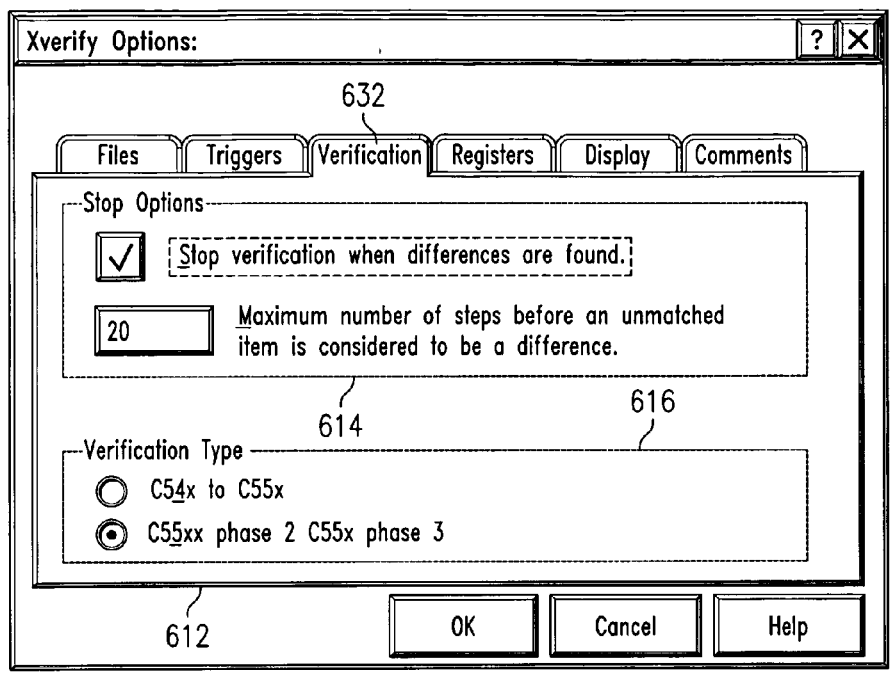

Verification display 612, displayed by selecting verification tab 632 and shown in FIG. 6C, allows the user to set some generic options related to the verification process. These options include stop options 614 and verification type options 616. Stop options 614 allows the user to optionally require the verification process to halt when a difference between the source and target programs is detected. The meaning of a "difference" depends on the selection made in address registers options 619 (see FIG. 6D). If this option is not selected, the verification process will execute and simply log differences to message view 504 and optionally to a message log file. Verification type options 616 allow the user to specify the ISAs of the source and target programs.

Registers display 618, displayed by selecting registers tab 633 and shown in FIG. 6D, allows the user to specify the strictness of the register comparison to be used during the verification process. If the "Track register contents" of Address Registers 619 is selected, the contents of the address registers in the source program are compared with the contents of their counterparts in the target program. (See Table 2.) This option should only be used if the two programs have been linked at the same memory location. It will provide a stricter comparison between the two programs. If the two programs have not been linked at the same memory location, the "Do not track . . . " option of Address Registers 619 should be used. With this option, the actual contents of the address registers will not be tracked but writes to memory through those registers will be tracked.

Figure 6E:
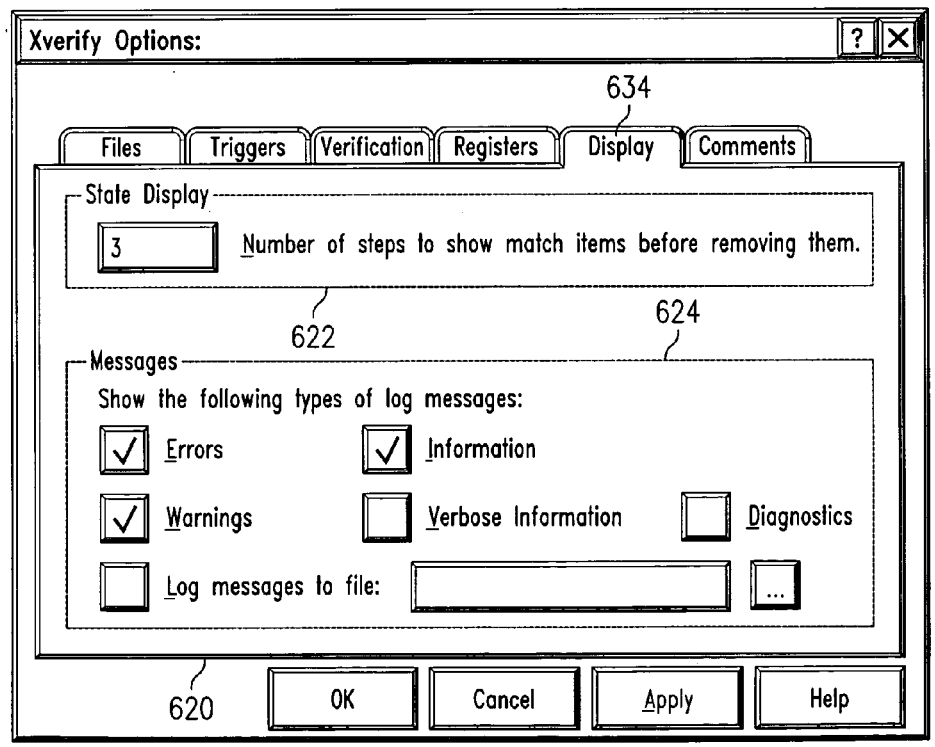

Display display 620, displayed by selecting display tab 634 and shown in FIG. 6E, allows the user to specify the level of detail to be shown in verification state view 506 and message view 504. In State Display 622, the user may specify the number of steps to show matched (reconciled) items before removing them from verification state view 506. In Messages 624, the user may specify the types of messages to be displayed in message view 504 and request to have the messages written to a user-specified log file. The message types are defined in Table 5.

TABLE 5

| | |
|---|---|
| Errors | A recoverable error due to an unexpected input to the verification tool. The tool attempts to continue the verification, but the user should examine the source of the error. This type of error may occur if the simulator detects invalid instructions. |
| Warnings | The verification process has found an inconsistency in the execution the source and target programs. The exact nature of the inconsistency is listed in verification state view 506. |
| Information | Informational messages for the user about the status of the verification (e.g. ON, OFF, STOP triggers hit), Running, Stopped, Stepped. |
| Verbose Information | More detailed information, particularly suited for logging to the log file. The text from Comments display 624 is printed as a verbose message when the session is started. |
| Diagnostics | Diagnostic messages meant to aid in the reporting of bugs in the verification tool. This level of messages may produce a great deal of text, including the details of each step of the verification process. |

Comments display 626, displayed by selecting comments tab 635 and shown in FIG. 6F, allows the user to enter a text comment for the associated verification document. This is useful for describing the purpose of the document. These comments are displayed in message view 504 when the document is opened if the verbose information option is selected in Messages 624.

When an application is ported to a different ISA, there may not be a one-to-one correspondence between the memory addresses in the source program and those of the target program. The size of the application may have increased or decreased due to ISA differences or a data structure may have been relocated in memory or merged with another data structure to take advantage of special features in the target ISA. This disparity in memory addresses between the source and the target versions of the application complicates the verification process as the contents of the mapped address registers in each version will not necessarily be the same.

Indirect memory writes are validated symbolically during the verification process. Indirect writes to memory through address register expressions are verified by determining that the values written to memory locations computed by the address register expressions in the source and target versions are equivalent. The verification process treats references to address registers symbolically and computes the effective addresses of the analogous references in the source and target applications independently when attempting to verify that two unreconciled states are equivalent.

The example sequence of assembly language code in FIGS. 4A–4H illustrates this embodiment. The memory location of data1 is different in the source and target code, so that the contents of AR3 after the first instruction in each code sequence is different as shown in source state 405 and target state 406 in FIG. 4C. When the instruction STL A, *AR3+ is executed, the contents of register A are written to the memory address stored in register AR3 as shown in source state 405 of FIG. 4F. At this point, rather than treating the unreconciled state created by this change to memory as a write to the memory address 0x800, the unreconciled state is remembered as being a write to the memory address represented by the symbol *AR3. Note that if the unreconciled state is viewed as being a change in memory at address 0x800, no equivalent state would ever be detected on the target processor because of the different memory addresses of the symbol data1. When the instruction MOV AC0<<#0, AR3+ is executed on the target ISA, the contents of register AC0 is written to the memory address stored in register AR3 as shown in target state 406 of FIG. 4G. This unreconciled state is viewed as being a write to the memory address represented by the symbol *XAR3. When checking to see if this new unreconciled state is equivalent to the unreconciled state created during the execution of the code sequence on the source ISA, the validation process recognizes that the source unreconciled state and the target unreconciled state are both writes to the same symbol. (The registers AR3 and XAR3 are equivalent for verification purposes as shown in Table 2.) Therefore, if the same value has been written to memory at the respective addresses represented by this symbol in the source and target executions, the two unreconciled states are equivalent and may be reconciled. It is important to note that any register expression involving symbols and constants, such as XAR3+5, not just simple register expressions, will be handled similarly.

Figure 7:
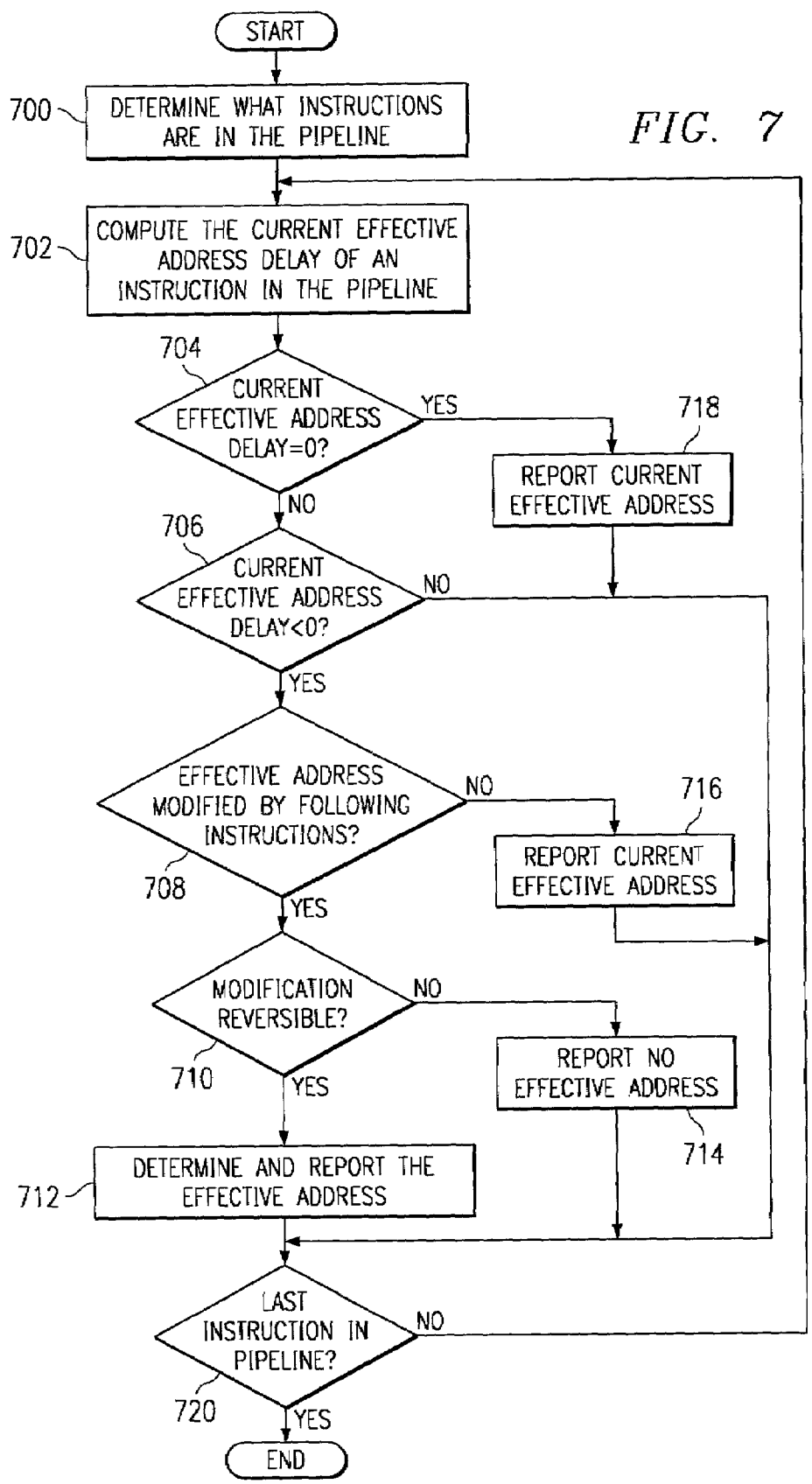
FIG. 7 presents a method for enhancing the visibility of effective addresses in a pipelined architecture during a verification process used by the verification method of FIG. 3.

FIG. 7 presents a method for enhancing the visibility of effective addresses in a pipelined architecture during a verification process. Note: An effective address is the address at which a memory operation occurred. Through the use of this method, a verification process or debugger can infer the effective address of many instructions in a pipeline architecture where that effective address would otherwise be invisible due to the behavior of the pipeline.

Most modern general-purpose microprocessors and digital signal processors have a central processing unit (CPU) pipeline where multiple instructions are in various stages of execution at any given time. Instructions move through the pipeline like products through an assembly line. At each phase of the pipeline, each instruction performs an action specific to that phase. For example, an ADD instruction will read both operands during the Read phase and perform the addition during a later Execute phase.

When a pipelined processor is halted, often the pipeline is left "full" of partially executed instructions. The state of execution of the application includes whatever effects have already taken place from these partially executed instructions. Instructions may cause effects that mask one another, making it difficult to see the interim results of an instruction in progress. One particular problem is determining the effective address of a memory operation when that address is calculated, used, and altered while the instruction causing the memory operation is still in the pipeline. By the time such an instruction is completely executed, the effective address of the actual memory operation is no longer available.

For example, assume that the CPU instruction pipeline has four phases: decode, access, read, and execute. Instructions enter the pipeline in the decode phase and move through the access, read, and execute phases in sequence.

Table 6 illustrates what occurs in each phase of the pipeline when a simple memory write is caused by the execution of a store instruction such as ST A, *AR1+. This instruction causes the contents of register A to be written into memory at the effective address contained in register AR1. In addition, AR1 will be incremented to the next memory address.

TABLE 6

| Pipeline Phase | Effect |
| --- | --- |
| Execute | Memory at the effective address is written |
| Read | Value of A is read |
| Access | Effective address for this operation is set, and AR1 is incremented |
| Decode | Instruction is decoded (i.e. recognized) |

As Table 6 illustrates, by the time the instruction is executed, the register AR1 no longer contains the address where the actual write occurred, the effective address of the instruction. This effective address is almost never available to emulators or debuggers and discerning the actual effective address is difficult at times.

The method presented in FIG. 7 works within the following constraints which are common to most pipelined architectures: 1) all instructions enter the pipeline at one particular phase (often called decode); 2) all instructions travel through the entire pipeline even though they may not perform meaningful work at each phase of the pipeline; and, 3) the number of clock cycles that a given instruction will spend in each phase of the pipeline can be determined a priori.

At step 700, a determination is made as to what instructions are currently in the pipeline. There are a number of ways to accomplish this determination including: 1) executing the software in single-step mode and recording each instruction as it enters the pipeline; or, 2) utilizing an emulator or simulator that can report which instruction is in each phase of the pipeline. Such features are available in some modern emulators and simulators.

Once this determination is made, the current effective address for any relevant instruction in the pipeline is ascertainable in most instances. Note: In rare cases, it may not be possible to determine the current effective address such as when an address register is used and then reloaded from memory in a subsequent instruction. First, in step 702, the effective address delay of the instruction is calculated. This effective address delay is the number of CPU clock cycles from the point where the instruction enters the pipeline at the decode phase to the point where the effective address that will be used for the instruction is fully computed. The effective address delay is then reduced by the number of clock cycles that have occurred since the instruction entered the pipeline. The resulting number is used in subsequent steps of the method to determine if a current effective address is available, is not applicable as the instruction has not reached a phase where the effective address is calculated, or must be "inferred" because the effective address has been masked by the execution of subsequent instructions in the pipeline.

In step 704, if the current effective address delay of the instruction is 0, the effective address for the memory operation is available and is reported at step 718. The method then proceeds to the next instruction in the pipeline, if any, via step 720. If the current effective address delay is found not to be less than 0 at step 706, no further action for the instruction under consideration is required as the instruction has not yet reached a point where a memory operation has occurred. The method proceeds to the next instruction in the pipeline, if any, via step 720.

If, at step 706, the current effective address delay is negative, the effective address of the memory operation has potentially been compromised. At step 708, a check is made to determine if any of the subsequent instructions in the pipeline have modified any of the factors that are involved in the effective address calculation of the instruction under consideration. If not, the current effective address may be reported and the method proceeds to the next instruction in the pipeline, if any, via step 720. If the subsequent instructions have modified one or more of the factors involved in the effective address calculation, a check is made at step 710 to determine if these modifications are reversible (i.e., the modifications can be applied in reverse order to the current effective address to determine the actual effective address of the instruction). If the modifications are reversible, at step 712, the actual effective address is determined and reported. The method proceeds to the next instruction in the pipeline, if any, at step 720. If, at step 710, a determination is made that the modifications are not reversible, an indication that there is no effective address available for the current instruction is reported and the method proceeds to the next instruction in the pipeline, if any, at step 720.

The verification process includes a method for enhancing the visibility of effective address computation in pipelined architectures when the application to be verified is executed on a CPU with a pipelined architecture (source and/or target). The application program is executed in single-step mode to detect unreconciled states as they occur. At each execution step, the verification process calculates the current effective address delay for each instruction in the pipeline and reports the current effective address (if possible) as illustrated in FIG. 7. The verification process knows what instructions are in the pipeline and their current pipeline phase because it remembers each instruction is as it enters the pipeline and knows how many clock cycles are required for each relevant phase of each instruction.

For example, consider the execution of the code sequence in Table 7.

TABLE 7

| | |
| --- | --- |
| (line 1) NOP | |
| (line 2) NOP | |
| (line 3) STM #100, AR1 | ; AR1 = 100; |
| (line 4) ST  A, *AR1+ | ; memory(100) = A |
| (line 5) ST  A, *AR1+ | ; memory(101) = A |
| (line 6) NOP | |
| (line 7) NOP | |

Table 8 contains a brief explanation of the operation of each instruction of the code sequence in Table 7.

TABLE 8

| Instruction | Explanation |
| --- | --- |
| NOP | No operation |
| STM #100, AR1 | Store immediate value (100) into address register 1 |
| ST A, *AR1+ | Store the contents of register A into the memory address contained in address register 1 and autoincrement the address |

Table 9 show the contents of the pipeline when the instruction on line 4 of Table 7 enters the decode phase.

TABLE 9

| Pipeline Phase | Instruction |
| --- | --- |
| Execute | (line 2) NOP |
| Read | (line 3) STM #100, AR1 |
| Access | (empty) |
| Decode | (line 4) ST A. *AR1+ |

The effective address delay for this instruction is two because its effective address will be set in two clock cycles. The pipeline contents after the next single step are shown in Table 10.

TABLE 10

| Pipeline Phase | Instruction |
| --- | --- |
| Execute | (line 3) STM = 100, AR1 |
| Read | (empty) |
| Access | (line 4) ST A. *AR1+ |
| Decode | (line 5) ST A. *AR1+ |

At this point, the effect address delay of the instruction on line 4 is one because its effective address will be set in one cycle. The instruction on line 5 is a two-cycle instruction so, on the next single step, the pipeline will advance two phases. The resulting contents of the pipeline are shown in Table 11.

TABLE 11

| Pipeline Phase | Instruction |
| --- | --- |
| Execute | (line 4) ST A, *AR1+ |
| Read | (line 5) ST A, *AR1+ |
| Access | (empty) |
| Decode | (line 6) NOP |

The effective address delay for the instruction on line 4 is now a negative one because of the two-cycle instruction that followed it in the pipeline. The address in AR1 has been incremented twice and the effective address of the instruction is not visible to the verification process. Because the instruction on line 5 has not changed the contents of AR1 (other than the autoincrement), the effective address for the instruction on line 4 can be "reverse-engineered" by simple subtraction. In the general case, this reverse engineering may be more difficult if bit-reversed addressing or circular addressing modes are used but is it usually a tractable problem. In the rare case where it is not possible to reverse the effect of a later instruction, such as reloading AR1 from memory rather than a simple autoincrement, the verification process warns the user that the verification might be inaccurate.

Thus, a system and methods have been described for verifying that a ported version of a software application has execution behavior equivalent to the original version. The present invention provides a significant advantage over the prior art. Verification by comparing the execution behavior of the source and target versions of an application provides thorough and detailed validation that the target version is executing correctly. Because the verification process examines each instruction, the user can know exactly where the two versions of the application differ, not just that they differ. And, by running each version of the application in a simulator or emulator under the control of a full software development system, when a discrepancy is found during the verification process, the debugger in each software development system can be activated at the point of the discrepancy, thus facilitating the debug process.

The present invention is discussed in conjunction with software verification and debugging. However, it has applications that extend beyond software. While the invention has been described with reference to illustrative embodiments, this description should not be construed in a limiting sense. Various other embodiments of the invention will be apparent to persons skilled in the art upon reference to this description.

For example, the verification method may be applied to any automated process that produces intermediate states during execution and is amenable to emulation or simulation.

As used herein, the term "debug" is not intended to be limiting. Debug operations refer to any of the sort of tasks performed during development of software and/or hardware, including hardware emulation.

It is therefore contemplated that the appended claims will cover any such modifications of the embodiments as fall within the true scope and spirit of the invention.

What is claimed is:

1. A method for determining in software the effective address of instructions in a program executed on a pipelined architecture where there is no external visibility into the pipeline, the method comprising the steps of:
    executing a first program;
    determining that a first instruction is in the pipeline;
    calculating the current effective address delay of the instruction in the pipeline;
    determining whether a valid effective address for the instruction is available based on the current effective address delay of the instruction;
    computing the effective address of the instruction responsive to determining that a valid effective address is not available; and
    reporting the effective address of the instruction.

2. The method of claim 1 wherein the step of calculating comprises subtracting the number of clock cycles that have occurred since the instruction entered the pipeline from the number of clock cycles required to compute the effective address of the instruction;
    wherein the step comprises determining whether the current effective address delay 0;
    and wherein the step of computing is executed responsive to the current effective address delay being less than 0.

* * * * *